United States Patent [19]

Shamir

[11] Patent Number: 4,933,970

[45] Date of Patent: * Jun. 12, 1990

[54] VARIANTS OF THE FIAT-SHAMIR IDENTIFICATION AND SIGNATURE SCHEME

[75] Inventor: Adi Shamir, Rehovot, Israel

[73] Assignee: Yeda Research and Development Company Limited, Rehovot, Israel

[*] Notice: The portion of the term of this patent subsequent to May 31, 2005 has been disclaimed.

[21] Appl. No.: 145,402

[22] Filed: Jan. 19, 1988

[51] Int. Cl.⁵ .............................................. H04L 9/00
[52] U.S. Cl. ........................................ 380/30; 380/23
[58] Field of Search ................................... 380/23-25, 380/30, 46

[56] References Cited

U.S. PATENT DOCUMENTS

| | | | |
|---|---|---|---|
| 4,612,413 | 9/1986 | Robert et al. ........................ | 380/23 |
| 4,625,076 | 11/1986 | Okamoto et al. ..................... | 380/30 |
| 4,736,423 | 4/1988 | Matyas .................................. | 380/30 |
| 4,748,668 | 5/1988 | Shamir et al. ......................... | 380/30 |

*Primary Examiner*—Salvatore Cangialosi
*Attorney, Agent, or Firm*—Fleit, Jacobson, Cohn, Price, Holman & Stern

[57] ABSTRACT

A method and apparatus are disclosed and claimed which enable an entity to generate proofs of identity and signatures of messages that everyone can verify but no one can forge. Compared to other schemes of this type (such as the RSA), the Fiat-Shamir scheme is faster by one to two orders of magnitude. In the present invention disclosed and claimed in this patent application, two improved variants of the Fiat-Shamir scheme are described which are even faster. One variant uses small public values to optimize the vertification procedure, and the other variant uses particular secret values to optimize the generation procedure.

64 Claims, 2 Drawing Sheets

VARIANTS OF THE FIAT-SHAMIR IDENTIFICATION AND SIGNATURE SCHEME

FIELD OF INVENTION

The present invention relates to a method and apparatus for implementing an identification and signature scheme and, more particularly, relates to an improvement to the method and apparatus disclosed and claimed in, and is a continuation-in-part of, U.S. patent application Ser. No. 883,247 filed July 9, 1986 in the names of Adi Shamir and Amos Fiat, now U.S. Pat. No. 4,748,668.

SUMMARY OF INVENTION

In the aforementioned parent patent application (t which we refer henceforth as the original Fiat-Shamir scheme), a method and apparatus are disclosed and claimed which enable an entity to generate proofs of identity and signatures of messages that everyone can verify but no one can forge. Compared to other schemes of this type (such as the RSA), the Fiat-Shamir scheme is faster by one to two orders of magnitude. In the present invention disclosed and claimed in this patent application, two improved variants of the Fiat-Shamir scheme are described which are even faster. One variant uses small public values to optimize the verification procedure, and the other variant uses particular secret values to optimize the generation procedure. To keep these variants secure and to fully exploit their improved performance, some of the details of the original method and apparatus disclosed and claimed in the aforementioned parent patent application have been modified. In particular, the public key of an entity is no longer computed as a function of its identity I, the quadratic expressions are generalized to d-th powers, and the execution of the protocol is usually not iterated, but may be.

Other and further objects and advantages of the present invention will be evident from the following detailed description taken in conjunction with the drawings.

DETAILED DESCRIPTION OF A PREFERRED EMBODIMENT

Figure 1:
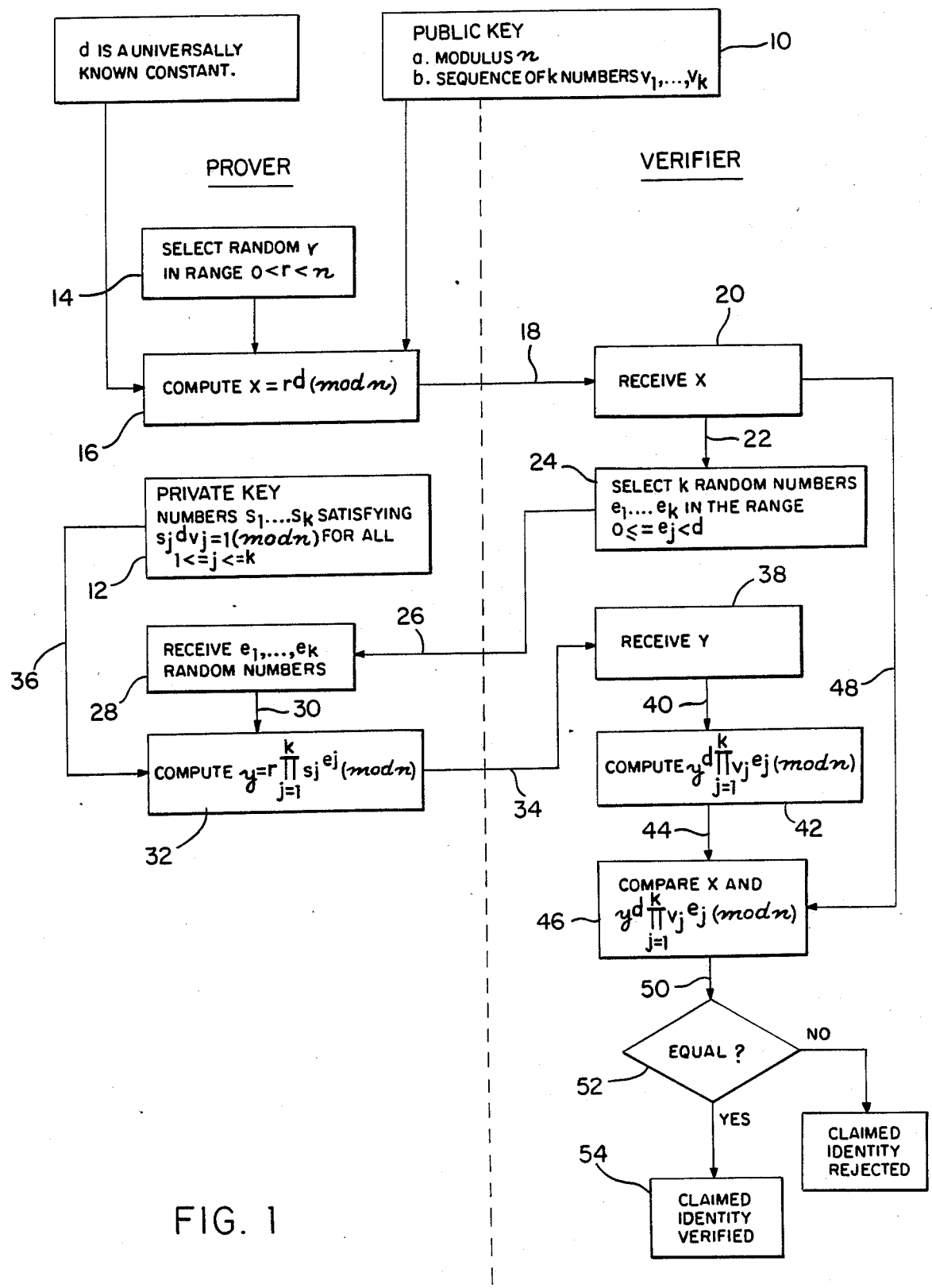
FIG. 1 is a schematic showing the novel method and apparatus for proving identity.

Referring now to the drawings, the basic structure of the new and improved variants of the method and apparatus of the aforementioned parent patent application is illustrated in FIG. 1 for a proof of identity. As shown, an entity either selects or is given a public key, see block 10, consisting of a modulus n which is the product of at least two prime numbers, and a sequence of k numbers $v_1, \ldots, v_k$. This public key can be stored in a public key directory, or sent to the verifier along with a trusted center's signature on it to establish its authenticity. The entity computes a corresponding private key, block 12, consisting of numbers $s_1, \ldots, s_k$ satisfying $s_j^d v_j = 1$ (mod n) for all $1 \leq j \leq k$, where d is some universally known constant larger than 1.

Accordingly, the identification technique proceeds as follows.

To prove his, hers or its identity, the entity chooses a random r in the range $0 < r < n$, block 14, and sends $x = r^d$ (mod n) to the verifier, block 16 and line 18, where it is received by the verifier, block 20. Upon receipt of x, line 22, the verifier chooses k random numbers $e_1, \ldots, e_k$ in the range $0 \leq e_j < d$, block 24, and sends them to the prover, line 26. The prover, in response to receipt of $e_1, \ldots, e_k$, block 28, computes and sends $$y = r \prod_{j=1}^{k} s_j^{e_j}$$

(mod n) to the verifier, block 32, line 34. Line 36 sends the $s_j$ values from block 12 to block 32. The verifier upon receipt of y value in block 38, via line 40, computes in block 42 the value $$y^d \prod_{j=1}^{k} v_j^{e_j} \pmod{n}.$$

This value is sent via line 44 to block 46 where it is compared with the value x, via line 48. The result is passed by line 50 to block 52 where the judgment is made. The verifier accepts the proof of identity in block 54 if $$x = y^d \prod_{j=1}^{k} v_j^{e_j} \pmod{n},$$

and rejects the proof of identity if this equality does not hold.

Figure 2:
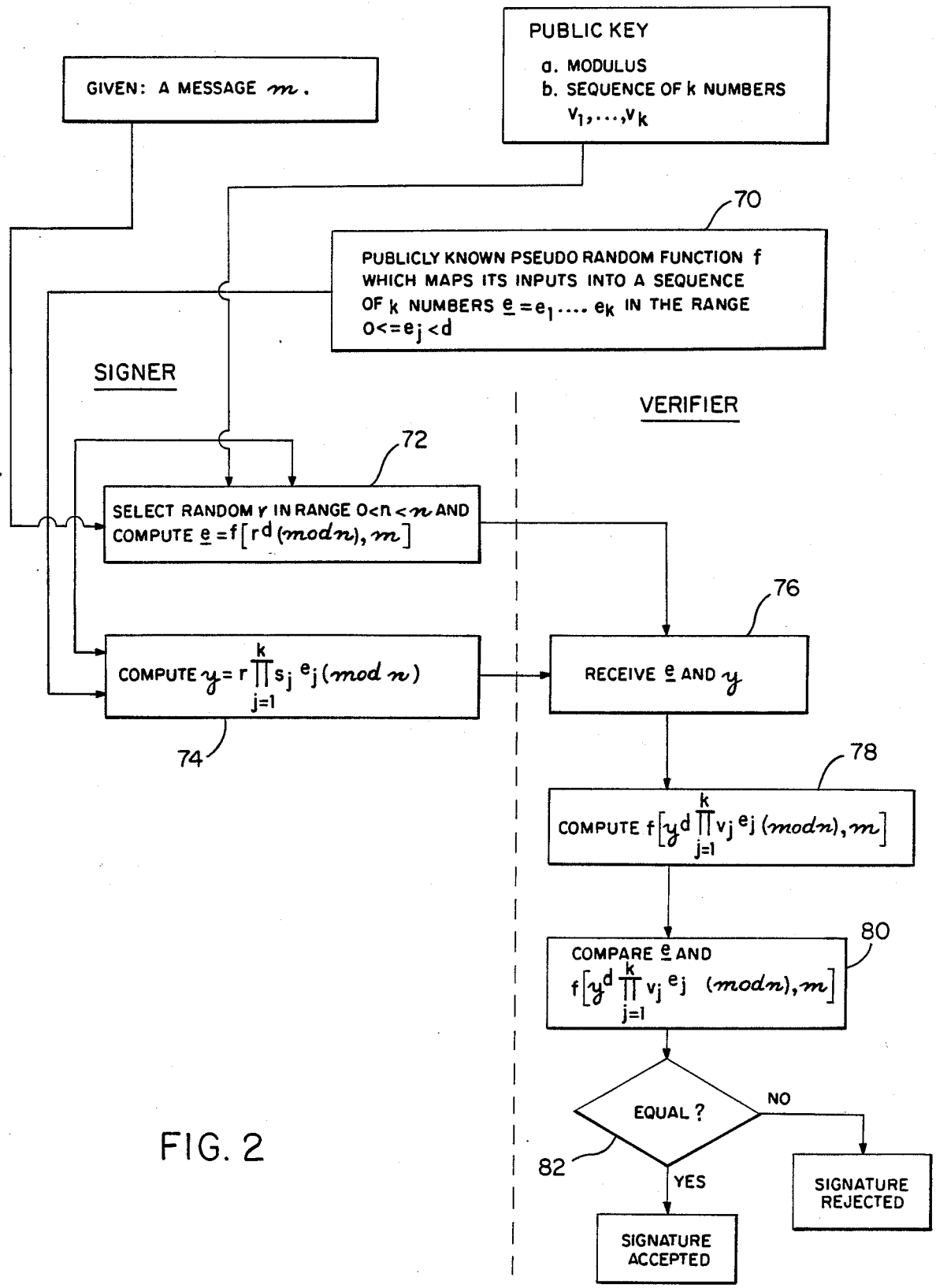
FIG. 2 is a schematic showing the novel method and apparatus for generating and verifying a signature to a message.

The signature technique of the present invention is schematically portrayed in FIG. 2. As shown, the identification scheme of FIG. 1 is turned into a signature scheme by using some publicly known cryptographically strong pseudo random function f which maps its inputs into a sequence of k numbers $e = e_1, \ldots, e_k$ in the range $0 \leq e_j < d$, block 70. To generate a signature for message m according to the present invention, first, a random r in the range $0 < r < n$ is chosen. Then, $e = f(r^d$ (mod n), m) is computed in block 72. Next $$y = r \prod_{j=1}^{k} s_j^{e_j} \pmod{n}$$

is computed in block 74. The signature of m consists of e and y. These values are either stored or sent to the verifier where they are received in block 76.

To verify the stored or transmitted signature, the verifier computes $$f\left( y^d \prod_{j=1}^{k} v_j^{e_j} \pmod{n}, m \right),$$

block 78. These values are compared with e, block 80. If equal, block 82, the signature is accepted as genuine and, if not, the signature is rejected as a forgery.

The best known attack on these identification and signature techniques has a probability of success of $d^{-k}$ per attempt. To make the interactive identification protocol secure, it usually suffices to choose $d^k$ larger than or equal to $2^{20}$ since a cheater has only one chance to forge a proof of identity. To make the non-interactive signature technique secure against repeated attempts to forge a signature, $d^k$ should be at least $2^{64}$. This can be achieved either by using sufficiently large values of d and k, or by iterating the executions of these schemes t times and making sure that $d^{kt} \geq 2^{64}$. In most applications, the first option is recommended since it minimizes both the number of modular multiplications and the number of communicated bits.

In the first variant of the present invention, small $v_j$ values are used. In the preferred embodiment of this variant, d is 2 or 3, and all the entities choose the numbers $v_j$ as the first k primes $v_1=2$, $v_2=3$, $v_3=5$, etc. Since the $v_j$ are universal, only the modulus n has to be specified in the public-key directory. In a typical implementation of this variant with k=64 numbers and 512 bit modulus, the size of each entry in the public-key directory is 64 bytes, and the size of each signature is 72 bytes, which are comparable with those of the RSA signature scheme. The size of the private key is about 4 kilobytes, but since each entity has to store only one such file, it can fit into almost any microcomputer based device (with the possible exception of a smart card). With optimized implementations, it is possible to generate proofs of identity in less than 10 modular multiplications and to generate signatures in less than 30 modular multiplications, which is the same as in the original Fiat-Shamir scheme. However, since multiplications by the small $v_j$ values (most of which fit in a single byte) have negligible complexity, the verification of identities and signatures in this variant requires only 1 or 2 full-size modular multiplications. This is an order of magnitude faster than in the original Fiat-Shamir scheme, and is expected to take only tens of milliseconds on a standard microprocessor and less than a millisecond on a mainframe computer. The high efficiency of verification can be crucial when a central computer has to verify many access requests or signed documents generated in thousands of terminals, or when a remotely controlled robot has to verify in real time a stream of signed instructions generated by a more powerful central computer.

The choice of exponent d depends on the relative importance of efficiency and convenience. When d=2, the scheme requires the fewest number of modular multiplications, but the square roots of the $v_j$ do not always exist. It is thus necessary to modify the scheme in one of the following ways.

1. Each entity can choose its own set of small $v_j$ values, making sure that all of them are quadratic residues modulo the entity's n. These $v_j$'s should be published in full in the public-key directory.

2. Use a longer list of standard $v_j$ values and each entity can choose a subset of k values which are quadratic residues modulo its own n (when n is the product of two primes, the universal list should contain about 4k numbers). The entity's chosen subset should be specified in the public-key directory or sent as part of the signature.

3. Each entity is allowed to modify the standard $v_j$ which are quadratic non-residues. A particularly simple way to achieve this is to pick a modulus n=pq where $p=3 \pmod 8$ and $q=7 \pmod 8$, since then exactly one of $v_j$, $-v_j$, $2v_j$, $-2v_j$ is a quadratic residue mod n for any $v_j$. The appropriate variant of each $v_j$ can be specified in the public-key directory, sent as part of the signature, or deduced by the verifier himself during the verification of given signatures.

Alternatively, the entities can use d=3 and avoid all these complications. If the totient function of n is not divisible by 3, then any $v_j$ value has a cubic root mod n. However, this choice of d requires an additional modular multiplication during the generation and the verification of signatures.

The choice of the $v_j$ as the first k primes in the preferred embodiment is based on the fact that large values can make the scheme less efficient, and multiplicatively related values can make the scheme less secure. However, the $v_j$ can be chosen as any other sequence of k numbers.

As described in the parent Fiat-Shamir application, there are many possible tradeoffs between the size of the keys, the number of communicated bits, and the number of modular multiplications. All the optimization ideas described in the parent patent application are equally applicable to this variant.

In a second variant of the present invention, particular $s_j$ values are used. In this variant, the entities can choose their own moduli n, or can use a universal modulus n published by a trusted center (the first option is more secure, while the second option reduces the size of the public key). Each entity chooses a sequence of particular secret numbers $s_1, \ldots, s_k$, and computes the corresponding public numbers $v_1, \ldots, v_k$ as $$v_j = \frac{1}{s_j^d} \pmod{n}$$

(note that this computation can be carried out even when the factorization of n is unknown). Each $s_j$ should be at least 64 bits long to protect it from exhaustive search attacks, and the exponent d should be large enough to guarantee that $s_j^d > n$ (e.g., when $|n|=512$ and $|s_j|=64$, d should be at least 16 to guarantee sufficient wraparound). The computed values of $v_1, \ldots, v_k$ (and the entity's modulus n, if applicable) are placed in the public key directory. The actual generation and verification of proofs of identity and signatures is carried out in the way specified above.

Known components can be used for the apparatus of the present invention as portrayed in FIG. 1 and FIG. 2, the means to carry out the several steps of the process being apparent to those skilled in the art.

Although the invention has been shown and described in terms of a specific preferred embodiment and variants, changes and modifications are possible which do not depart from the spirit, scope or contemplation of the inventive concepts disclosed herein. Such are deemed to fall within the purview of the invention as claimed.

What is claimed is:

1. A method of proving the identity of an entity comprising the steps of
   (a) establishing a public key for the entity consisting of a modulus n which is the product of at least two prime numbers, and a sequence of k numbers $v_1, \ldots, v_k$;
   (b) computing a private key for the entity consisting of k numbers $s_1, \ldots, s_k$ satisfying $s_j^d v_j = 1 \pmod{n}$ for all $1 \leq j \leq k$, where d is a universally known constant larger than 1;

(c) transmitting from the entity to a verifier $x = r^d \pmod{n}$ where r is a random number in the range $0 < r < n$;

(d) transmitting from the verifier to the entity a sequence of k random numbers $e_1, \ldots, e_k$ in the range $0 \leq e_j < d$;

(e) transmitting from the entity to the verifier the value $$y = r \prod_{j=1}^{k} s_j e_j \pmod{n};$$

(f) verifying the identity of the entity by checking that $$x = y^d \prod_{j=1}^{k} v_j e_j \pmod{n}.$$

2. A method as claimed in claim 1 wherein steps c, d, e and f are repeated t times where $t \geq 1$.

3. A method as claimed in claim 1 wherein the $v_j$'s are the same for all the entities.

4. A method as claimed in claim 1 wherein the $v_j$'s are the first k prime numbers.

5. A method as claimed in claim 1 including the further step of storing the modulus n and the k numbers $v_1, \ldots, v_k$ in a public key directory.

6. A method as claimed in claim 1 including the further step of transmitting the modulus n and the k numbers $v_1, \ldots, v_k$ from the entity to the verifier along with a trusted center's signature on this public key.

7. A method as claimed in claim 3 including the further step of storing the modulus n in a public key directory.

8. A method as claimed in claim 3 including the further step of transmitting the modulus n from the entity to the verifier along with a trusted center's signature on this public key.

9. A method as claimed in claim 1 wherein $d^k \geq 2^{20}$.

10. A method as claimed in claim 1 wherein d is either 2 or 3.

11. A method as claimed in claim 1 wherein k is at least 20.

12. A method as claimed in claim 1 wherein n is at least 512 bits long.

13. A method as claimed in claim 1 wherein the secret key $s_1, \ldots, s_k$ is chosen first and each $v_j$ is then computed as $$v_j = \frac{1}{s_j^d} \pmod{n}.$$

14. A method as claimed in claim 13 wherein all the entities use the same modulus n which is chosen by a trusted center that keeps its factorization secret.

15. A method as claimed in claim 13 wherein the $s_j$ are chosen as random numbers for all $1 \leq j \leq k$.

16. A method of generating a signature for a message m comprising the steps of
(a) establishing a public key for the entity consisting of a modulus n which is the product of at least two prime numbers, and a sequence of k numbers $v_1, \ldots, v_k$;
(b) computing a private key for the entity consisting of k numbers $s_1, \ldots, s_k$ satisfying $s_j^d r_j = 1 \pmod{n}$ for all $1 \leq j \leq k$, where d is a universally known constant larger than 1;

(c) agreeing on a common cryptographically strong pseudo random function f which maps its inputs into a sequence of k numbers $e = e_1, \ldots, e_k$ in the range $0 \leq e_j < d$;

(d) choosing a random number r in the range $0 < r < n$ and computing $e = f(r^d \pmod{n}, m)$;

(e) computing $$y = r \prod_{j=1}^{k} s_j e_j \pmod{n};$$

(f) transmitting or storing e and y as the entity's signature on m.

17. A method according to claim 16 comprising the further steps of
(a) computing $$f\left( y^d \prod_{j=1}^{k} v_j e_j \pmod{n}, m \right);$$

and
(b) comparing the computed values to e.

18. A method as claimed in claim 16 wherein $t \geq 1$ random numbers $r_1, \ldots, r_t$ are chosen in the range $0 < r_i < n$, $e = e_1^1, \ldots, e_k^t$ numbers in the range $0 \leq e_j^i < d$ are computed as $e = f(r_1^d \pmod{n}, \ldots, r_t^d \pmod{n}, m)$, t values $y_1, \ldots, y_t$ are computed as $$y_i = r_i \cdot \prod_{j=1}^{k} s_j e_j^i \pmod{n},$$

and $e, y_1, \ldots, y_t$ are transmitted or stored as the entity's signature on m.

19. A method as claimed in claim 18 comprising the further steps of computing $$f\left( y_1^d \prod_{j=1}^{k} v_j e_j^i \pmod{n}, \ldots, y_t^d \prod_{j=1}^{k} v_j e_j^i \pmod{n}, m \right);$$

and comparing the computed values to e.

20. A method as claimed in claim 18 wherein the $v_j$'s are the same for all the entities.

21. A method as claimed in claim 18 wherein the $v_j$'s are the first k prime numbers.

22. A method as claimed in claim 18 including the further step of storing the modulus n and the k numbers $v_1, \ldots, v_k$ in a public key directory.

23. A method as claimed in claim 18 including the further step of incorporating the modulus n, the k numbers $v_1, \ldots, v_k$, and a trusted center's signature on these values as part of the signature of the message m.

24. A method as claimed in claim 20 including the further step of storing the modulus n in a public key directory.

25. A method as claimed in claim 20 including the further step of incorporating the modulus n and a trusted center's signature on it as part of the signature of the message m.

26. A method as claimed in claim 18 wherein $d^k \geq 2^{64}$.

27. A method as claimed in claim 18 wherein d is either 2 or 3.

28. A method as claimed in claim 18 wherein k is at least 64.

29. A method as claimed in claim 18 wherein n is at least 512 bits long.

30. A method as claimed in claim 18 wherein the secret key $s_1, \ldots, s_k$ is chosen first and each $v_j$ is then computed as $$v_j = \frac{1}{s_j^d} \pmod{n}.$$

31. A method as claimed in claim 30 wherein all the entities use the same modulus n which is chosen by a trusted center that keeps its factorization secret.

32. A method as claimed in claim 30 wherein the $s_j$ are chosen as random numbers for all $1 \leq j \leq k$.

33. Apparatus for proving the identity of an entity comprising
   (a) means for establishing a public key for the entity consisting of a modulus n which is the product of at least two prime numbers, and a sequence of k numbers $v_1, \ldots, v_k$;
   (b) means for computing a private key for the entity consisting of k numbers $s_1, \ldots, s_k$ satisfying $s_j^d v_j = 1$ (mod n) for all $1 \leq j \leq k$, where d is a universally known constant larger than 1;
   (c) means for transmitting from the entity to a verifier $x = r^d$ (mod n) where r is a random number in the range $0 < r < n$;
   (d) means for transmitting from the verifier to the entity a sequence of k random numbers $e_1, \ldots, e_k$ in the range $0 \leq e_j < d$;
   (e) means for transmitting from the entity to the verifier the value $$y = r \prod_{j=1}^{k} s_j^{e_j} \pmod{n};$$

(f) means for verifying the identity of the entity by checking that $$x = y^d \prod_{j=1}^{k} v_j^{e_j} \pmod{n}.$$

34. Apparatus as claimed in claim 33 including means for repeating t times where $t \geq 1$, the transmitting from the entity to a verifier $x = r^d$ (mod n) where r is a random number in the range $0 < r < n$, the transmitting from the verifier, the transmitting from the entity to the verifier the value $$y = r \prod_{j=1}^{k} s_j^{e_j} \pmod{n},$$

and the verifying the identity.

35. Apparatus as claimed in claim 33 wherein the $v_j$'s are the same for all the entities.

36. Apparatus as claimed in claim 33 wherein the $v_j$'s are the first k prime numbers.

37. Apparatus as claimed in claim 33 including means for storing the modulus n and the k numbers $v_1, \ldots, v_k$ in a public key directory.

38. Apparatus as claimed in claim 33 including means for transmitting the modulus n and the k numbers $v_1, \ldots, v_k$ from the entity to the verifier along with a trusted center's signature on this public key.

39. Apparatus as claimed in claim 35 including means for storing the modulus n in a public key directory.

40. Apparatus as claimed in claim 35 including means for transmitting the modulus n from the entity to the verifier along with a trusted center's signature on this public key.

41. Apparatus as claimed in claim 33 wherein $d^k \geq 2^{20}$.

42. Apparatus as claimed in claim 33 wherein d is either 2 or 3.

43. Apparatus as claimed in claim 33 wherein k is at least 20.

44. Apparatus as claimed in claim 33 wherein n is at least 512 bits long.

45. Apparatus as claimed in claim 33 wherein the secret key $s_1, \ldots, s_k$ is chosen first and each $v_j$ is then computed as $$v_j = \frac{1}{s_j^d} \pmod{n}.$$

46. Apparatus as claimed in claim 45 wherein all the entities use the same modulus n which is chosen by a trusted center that keeps its factorization secret.

47. Apparatus as claimed in claim 45 wherein the $s_j$ are chosen as random numbers for all $1 \leq j \leq k$.

48. Apparatus for generating a signature for a message m comprising
   (a) means for establishing a public key for the entity consisting of a modulus n which is the product of at least two prime numbers, and a sequence of k numbers $v_1, \ldots, v_k$;
   (b) means for computing a private key for the entity consisting of k numbers $s_1, \ldots, s_k$ satisfying $s_j^d v_j = 1$ (mod n) for all $1 \leq j \leq k$, where d is a universally known constant larger than 1;
   (c) means for agreeing on a common cryptographically strong pseudo random function f which maps its inputs into a sequence of k numbers $e = e_1, \ldots, e_k$ in the range $0 \leq e_j < d$;
   (d) means for choosing a random number r in the range $0 < r < n$ and computing $e = f(r^d \pmod{n}, m)$;
   (e) means for computing $$y = r \prod_{j=1}^{k} s_j^{e_j} \pmod{n};$$

(f) means for transmitting or storing e and y as the entity's signature on m.

49. Apparatus according to claim 48 comprising
   (a) computing means for computing $$f\left( y^d \prod_{j=1}^{k} v_j^{e_j} \pmod{n}, m \right);$$

and
   (b) comparing means for comparing these computed values to e.

50. Apparatus as claimed in claim 48 wherein $t \geq 1$ random numbers $r_1, \ldots, r_t$ are chosen in the range $0 < r_i < n$, $e = e_1^1, \ldots, e_k^t$ numbers in the range $0 \leq e_j^i < d$ are computed as $e = f(r_1^d \pmod{n}, \ldots, r_t^d \pmod{n}, m)$, t values $y_1, \ldots, y_t$ are computed as $y_i = r_i \cdot \pi s_j^{e_u i} \pmod{n}$, and $e, y_1, \ldots, y_t$ are transmitted or stored as the entity's signature on m.

51. Apparatus as claimed in claim 50 comprising computing means for computing $$f\left(y_1^d \prod_{j=1}^{k} v_j e_j \pmod{n}, \ldots, y_t^d \prod_{j=1}^{k} v_j e_j \pmod{n}, m\right);$$

and comparing means for comparing the computed values to e.

52. Apparatus as claimed in claim 50 wherein the $v_j$'s are the same for all the entities.

53. Apparatus as claimed in claim 50 wherein the $v_j$'s are the first k prime numbers.

54. Apparatus as claimed in claim 50 including means for storing the modulus n and the k numbers $v_1, \ldots, v_k$ in a public key directory.

55. Apparatus as claimed in claim 50 including means for incorporating the modulus n, the k numbers $v_1, \ldots, v_k$, and a trusted center's signature on these values as part of the signature of the message m.

56. Apparatus as claimed in claim 52 including means for storing the modulus n in a public key directory.

57. Apparatus as claimed in claim 52 including means for incorporating the modulus n and a trusted center's signature on it as part of the signature of the message m.

58. Apparatus as claimed in claim 50 wherein $d^k \geq 2^{64}$.

59. Apparatus as claimed in claim 50 wherein d is either 2 or 3.

60. Apparatus as claimed in claim 50 wherein k is at least 64.

61. Apparatus as claimed in claim 50 wherein n is at least 512 bits long.

62. Apparatus as claimed in claim 50 wherein the secret key $s_1, \ldots, s_k$ is chosen first and each $v_j$ is then computed as $$v_j = \frac{1}{s_j^d} \pmod{n}.$$

63. Apparatus as claimed in claim 62 wherein all the entities use the same modulus n which is chosen by a trusted center that keeps its factorization secret.

64. Apparatus as claimed in claim 62 wherein the $s_j$ are chosen as random numbers for all $1 \leq j \leq k$.

* * * * *

UNITED STATES PATENT AND TRADEMARK OFFICE
CERTIFICATE OF CORRECTION

PATENT NO. : 4,933,970                                                      Page 1 of 1
DATED       : June 12, 1990
INVENTOR(S) : Adi Shamir It is certified that error appears in the above-identified patent and that said Letters Patent is hereby corrected as shown below:

<u>Title page,</u>
Item [*] Notice, should read -- This patent is subject to a terminal disclaimer --
Add Item:

-- [63]     Related U.S. Application Data

Continuation of Application No. 06/883,247, filed July 9, 1986, now USP 4,748,668, dated May 31, 1988. --

Signed and Sealed this

Twenty-first Day of December, 2004

JON W. DUDAS
*Director of the United States Patent and Trademark Office*